A. J. KELLY.
CAR BRAKE.
No. 255,431. Patented Mar. 28, 1882.
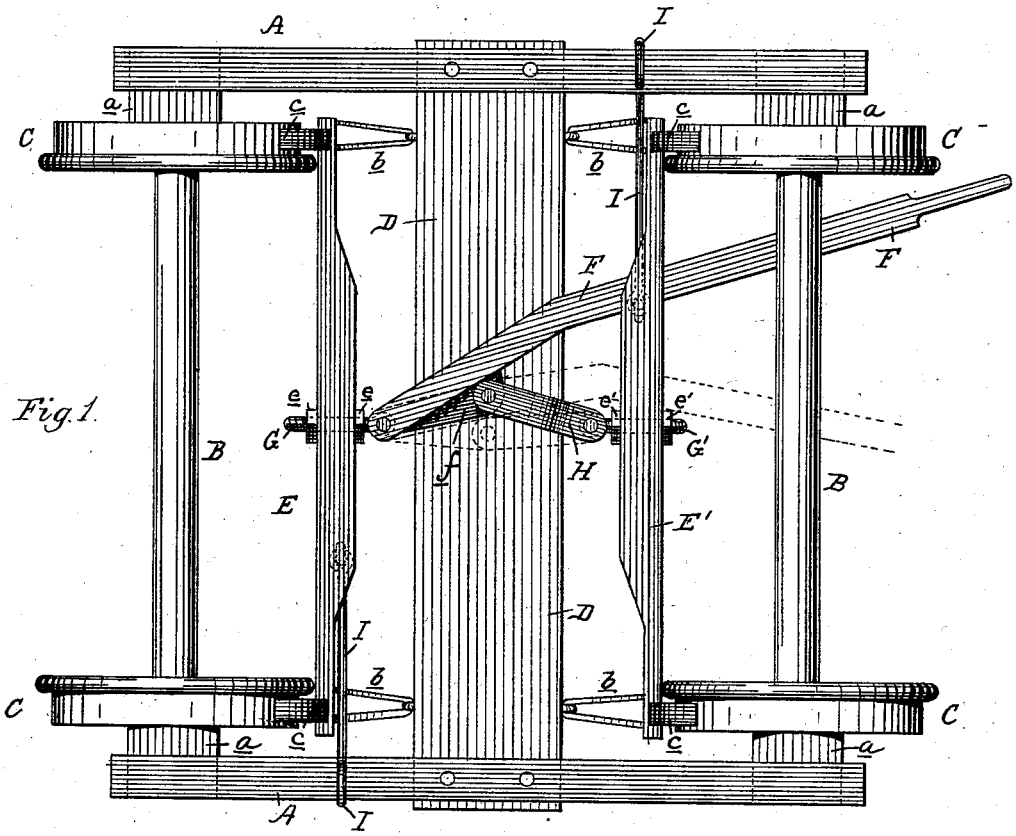
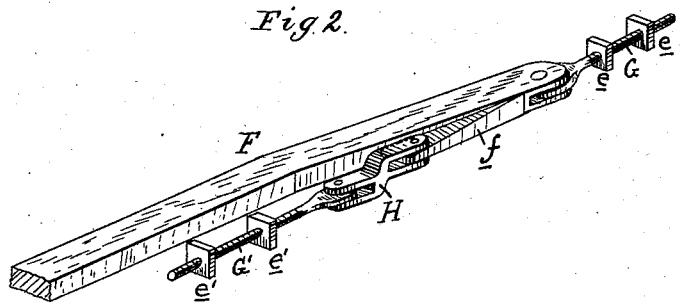
Witnesses
A. B. Robertson.
C. R. Wright
Inventor
A. J. Kelly.
By T. J. W. Robertson
Attorney.

UNITED STATES PATENT OFFICE.

ALPHEUS J. KELLY, OF SCIO, MICHIGAN.

CAR-BRAKE.

SPECIFICATION forming part of Letters Patent No. 255,431, dated March 28, 1882.

Application filed January 31, 1879.

*To all whom it may concern:*

Be it known that I, ALPHEUS J. KELLY, of the city of Scio, county of Washtenaw, and State of Michigan, have invented new and useful Improvements in Car-Brakes, of which the following is a specification.

This invention relates to certain improvements in car-brakes; and it consists in the peculiar construction, operation, and combination of parts, as more fully hereinafter described and claimed.

In the accompanying drawings, Figure 1 represents a bottom view of my improvements, and Fig. 2 a perspective view of the toggle-lever and its connections.

A A represent the metal side frame supporting the axle-boxes $a$, in which revolve the axles B of the wheels C, and D the cross-timbers connecting said frames, all the parts named being constructed in the ordinary well-known and approved method.

E E' represent the brake-bars, suspended from the cross-timber D by links $b$, and provided at their ends with brake-blocks $c$ to act against the wheels C.

F represents a long lever pivoted to one end of a bolt, G, which passes through the brake-bar E, and is supplied on each side of said bar with a nut, $e$. The lever F is supplied at its pivoted end with a projection, $f$, to which is pivoted one end of the link H, whose other end is pivoted to a bolt, G', which is secured to the brake-bar E by nuts $e'$ $e'$ in the same manner that the bolt G is secured to the opposite brake-bar. By the construction described the lever F, link H, and bolts G G' form a toggle-joint between the brake-bars, so that as the lever is moved into the position shown in dotted lines in Fig. 1 the brake-bars will be separated and forced toward the wheels. In this position the toggle-joint locks itself by reason of the central pivot passing the center line of the outer pivots, and consequently needs no other locking device. The link H is made crooked, as shown in Fig. 2, in order to allow the lever F to be situated above the brake-bar and axle, so as to be conveniently connected to an operating-lever at the end of the car. The lever should also be bent upward for the same purpose. By the use of the adjustable bolts G G' the toggle-joint formed by the lever F and link H can be lengthened as the brake-blocks become worn.

I I represent stays having their outer ends bent around the side frames, A, and their inner ends pivotally connected to opposite ends of the brake-bars E', as shown in Fig. 1. These stays, by being arranged on opposite sides, prevent the brake-bars from being pulled sidewise when the lever F is moved to apply the brakes.

I am aware that it is not new to operate car-brakes by means of toggle-joints between the brake-bars, and therefore I do not claim the use of a toggle-joint for the purpose specified.

What I claim is—

1. In combination with the brake-bars E E', the lever F, the projection $f$ of said lever, the link H, pivoted to the projection $f$, and suitable connections between the lever and link and the brake-bars, substantially as and for the purpose specified.

2. The lever F and the projection $f$ of said lever, in combination with the link H, the eye-bolts G G', and the nuts $e'$ $e'$, substantially as and for the purpose specified.

3. In combination with the side frames, A, the brake-bars E E', and the toggle-joint F H, the stays I I, connecting with the brake-bars and the side frames at opposite sides of the car, substantially as and for the purpose specified.

ALPHEUS JONES KELLY.

Witnesses:
ALPHEUS H. ROYS,
ANDREW J. SUTHERLAND.